F. J. KRENZ.
POTATO VINE LIFTER FOR CULTIVATORS.
APPLICATION FILED DEC. 7, 1916.
1,224,554.
Patented May 1, 1917.
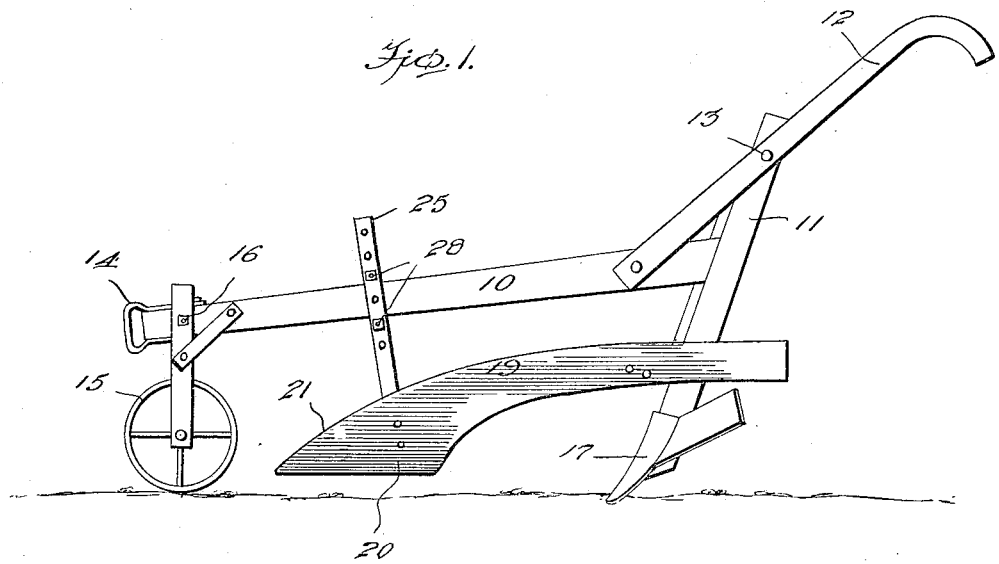
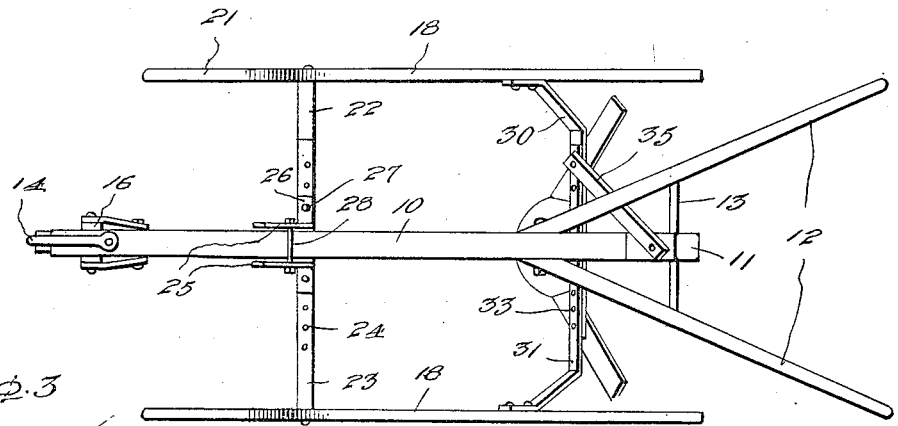
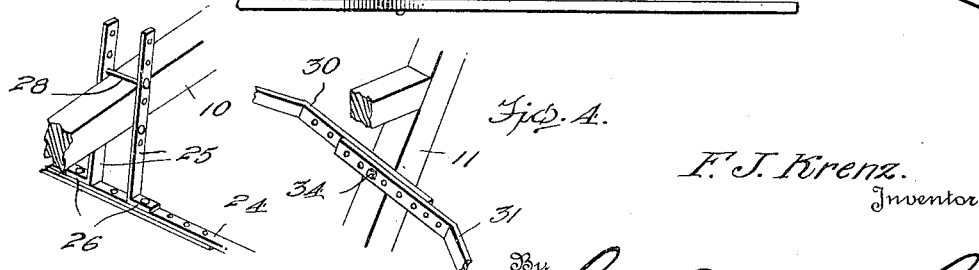
F. J. Krenz,
Inventor

UNITED STATES PATENT OFFICE.

FRED J. KRENZ, OF BLOOMER, WISCONSIN.

POTATO-VINE LIFTER FOR CULTIVATORS.

1,224,554.

Specification of Letters Patent.

Patented May 1, 1917.

Application filed December 7, 1916. Serial No. 135,622.

*To all whom it may concern:*

Be it known that I, FRED J. KRENZ, a citizen of the United States, residing at Bloomer, in the county of Chippewa and State of Wisconsin, have invented certain new and useful Improvements in Potato-Vine Lifters for Cultivators, of which the following is a specification.

The present invention relates to cultivators and has particular reference to new and useful improvements in potato vine lifters and the like attachments therefor.

My invention contemplates the provision of a novel form of a potato cultivator and vine lifter for attachment to a cultivator whereby when the vines are being "hilled" the same may be lifted so that the earth turned by the cultivator will not cover and destroy the vines.

My invention also contemplates the provision of a device of the character described which is capable of application to the various existing types of plow beam cultivators, the structure of the attachment being strong and durable, light and compact and capable of quick and easy attachment in operative position.

My invention still further contemplates the provision of a device of the class specified which is adjustable, the runners being relatively movable and adjustable relative the cultivator beam, so as to change the line of action of the device.

Other objects and advantages of my invention not appearing in the foregoing will appear from the following detailed description and the claims, taken with an inspection of the accompanying drawing, in which:

Figure 1 is a side elevation of a cultivator showing my improved potato vine lifter applied thereto;

Fig. 2 is a top plan of the same;

Fig. 3 is a fragmental detail in perspective of the forward connection of the runners to the beam; and Fig. 4 is a similar view showing the means for maintaining the rear portions of the runners in spaced relation.

Referring more particularly to the drawing, wherein similar characters of reference designate like and corresponding parts throughout the various views, 10 designates the plow beam or cultivator beam, 11 the stock and 12 the standard form of handles. The handles are secured to the stock by the usual transverse bar 13. A clevis is carried by the forward end of the beam 10 in order that the same may be connected to a draft animal. A supporting and guiding wheel 15 is carried in an adjustable bracket 16 mounted on the forward ends of the beam for an obvious purpose.

A plow or cultivator blade 17 is carried by the lower end of the stock 11 and may be of any standard make. The device of my invention includes a pair of runners 18 provided with ground engaging blade portions 20 having arms 19 extending therefrom providing means for connecting the same to the stock. The forward end of the upper marginal edges of the runners 18 are curved as at 21 for a purpose which will hereinafter appear.

The forward ends of the runners 18 are adjustably connected by means of a pair of bars 22 and 23, arranged in overlapping relation and provided with a plurality of openings 24 adapted for alinement. Vertical bars 25 extend downwardly and embrace the beam 10, the lower ends of the bars 25 being provided with feet 26 through which bolts 27 are adapted to pass, said bolts connecting said feet to the bars 22 and 23. A pair of bolts 28 extend through the bars 25 above and below the beam 10 to prevent vertical displacement of said bars.

The rear ends of the runners 18 are supported by means of angle brace bars 30 and 31, said bars lying in overlapping relation and being provided with alining apertures 33. The bars 30 and 31 are connected to the stock 11 by means of a bolt 34, said bolt passing through the stock and through certain of the perforations in said bars. A diagonal brace 35 extends between the bars and the stock, said brace serving to prevent rocking of the bars on the bolt 34.

In operation it will be apparent that the curved free ends of the runners will engage beneath the potato vines or the like moving the same to vertical position and maintaining the same in such position until the cultivator has turned the earth over upon the base portions of the vines, this serving to maintain the same vertical. In this manner the vines will not be buried, or broken during the cultivating process thereby increasing the crop.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a device of the class described, the combination with a plow stock and a beam extending therefrom having a supporting wheel on its forward end, of a pair of runners, transverse adjustable supporting bars for said runners, means to connect said bars to the plow beam and stock, the forward ends of said runners being enlarged and provided with curved margins to raise potato vines and the like into vertical position to prevent the same being buried during the cultivating process.

2. In a device of the class described, the combination with a plow stock and beam extending therefrom, of a pair of runners provided with enlarged front ends having the top margins thereof curved, a plurality of transverse bars carried by the beam and stock, said bars being adjustably connected, the free ends of the bars being connected to said runners whereby to adjustably support the same in parallel spaced relation to the cultivating blades.

In testimony whereof, I affix my signature hereto.

FRED J. KRENZ.

Copies of this patent may be obtained for five cents each, by addressing the "Commissioner of Patents, Washington, D. C."